(12) United States Patent
Eckel et al.

(10) Patent No.: US 10,675,794 B2
(45) Date of Patent: Jun. 9, 2020

(54) COATED ABRASIVE ARTICLE WITH FOAM BACKING AND METHOD OF MAKING

(75) Inventors: Joseph B. Eckel, Shoreview, MN (US); Steven J. Keipert, Somerset, WI (US); Ehrich J. Braunschweig, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 524 days.

(21) Appl. No.: 13/984,766

(22) PCT Filed: Feb. 6, 2012

(86) PCT No.: PCT/US2012/023921
§ 371 (c)(1),
(2), (4) Date: Sep. 11, 2013

(87) PCT Pub. No.: WO2012/115765
PCT Pub. Date: Aug. 30, 2012

(65) Prior Publication Data
US 2013/0344784 A1 Dec. 26, 2013

Related U.S. Application Data

(60) Provisional application No. 61/470,757, filed on Apr. 1, 2011, provisional application No. 61/446,212, filed on Feb. 24, 2011.

(51) Int. Cl.
*B24D 11/02* (2006.01)
*B29C 44/32* (2006.01)
(Continued)

(52) U.S. Cl.
CPC ......... *B29C 44/321* (2016.11); *B24D 11/001* (2013.01); *B24D 11/005* (2013.01);
(Continued)

(58) Field of Classification Search
CPC ....... B24B 11/00; B24B 11/02; B24B 11/001; B24B 3/00; B24D 11/00; B24D 11/001;
(Continued)

(56) References Cited

U.S. PATENT DOCUMENTS 4,083,325 A * 4/1978 Krumweide ........ B29C 44/1266
118/315
4,639,343 A * 1/1987 Long ...................... B29B 11/02
264/158
(Continued)

FOREIGN PATENT DOCUMENTS

CA           2637020       10/2009
JP         61-1169574       7/1986
(Continued)

OTHER PUBLICATIONS

International Search Report for PCT Application No. PCT/US2012/023921 dated Aug. 9, 2012, 5 pages.
(Continued)

*Primary Examiner* — Eileen P Morgan
(74) *Attorney, Agent, or Firm* — Aleksander Medved (57) ABSTRACT

A polyurethane foam backing suitable for making a coated abrasive article is disclosed. The polyurethane foam backing has a textured surface bearing an array of raised features and land areas. The array's geometry is designed such that a 90 degree peel force to remove a production tooling having a contacting surface bearing a plurality of microreplicated mold cavities from the textured surface is accept able.

20 Claims, 5 Drawing Sheets

(51) Int. Cl.
*B32B 37/26* (2006.01)
*B32B 38/06* (2006.01)
*B29C 44/48* (2006.01)
*B24D 11/00* (2006.01)
*B24D 18/00* (2006.01)
*B32B 38/00* (2006.01)
*B32B 37/15* (2006.01)
*B29C 44/34* (2006.01)
*B29K 75/00* (2006.01)

(52) U.S. Cl.
CPC .......... *B24D 11/02* (2013.01); *B24D 18/0009* (2013.01); *B29C 44/32* (2013.01); *B29C 44/485* (2013.01); *B32B 37/26* (2013.01); *B32B 38/06* (2013.01); *B29C 44/355* (2013.01); *B29K 2075/00* (2013.01); *B29K 2995/007* (2013.01); *B29K 2995/0063* (2013.01); *B29K 2995/0072* (2013.01); *B29K 2995/0097* (2013.01); *B32B 37/153* (2013.01); *B32B 38/0004* (2013.01); *B32B 2038/0084* (2013.01); *B32B 2307/72* (2013.01); *B32B 2309/10* (2013.01); *B32B 2309/105* (2013.01)

(58) Field of Classification Search
CPC .. B24D 11/005; B24D 11/02; B24D 18/0009; B24D 18/0027; B24D 18/0072; B29C 44/32; B29C 44/321; B29C 44/485; B32B 37/26; B32B 37/153; B32B 2038/0084; B32B 2307/72; B32B 2309/10; B32B 2309/105; B29K 2995/0063; B29K 2075/00
USPC .......... 451/526, 533, 539, 527, 530; 51/298, 51/309, 295
See application file for complete search history.

(56) References Cited

U.S. PATENT DOCUMENTS

| | | | |
|---|---|---|---|
| 4,740,258 A | 4/1988 | Breitscheidel | |
| 4,784,885 A * | 11/1988 | Carespodi | 428/36.8 |
| 5,109,638 A | 5/1992 | Kime, Jr. | |
| 5,435,816 A | 7/1995 | Spurgeon | |
| 5,490,890 A | 2/1996 | Morrison | |
| 5,962,120 A | 10/1999 | Keipert | |
| 6,059,850 A * | 5/2000 | Lise et al. | 51/297 |
| 6,527,991 B1 * | 3/2003 | Bakker | B29C 44/306 264/150 |
| 6,540,367 B1 | 4/2003 | Benson | |
| 6,797,371 B1 * | 9/2004 | Gehlsen | B29C 48/387 428/317.5 |
| 6,949,128 B2 * | 9/2005 | Annen | B24D 11/008 51/295 |
| 6,998,166 B2 * | 2/2006 | Prasad | 428/141 |
| 7,098,255 B2 * | 8/2006 | Seyanagi | B24B 37/24 438/631 |
| 7,235,114 B1 * | 6/2007 | Minick | B24D 3/004 451/533 |
| 7,300,479 B2 | 11/2007 | McArdle | |
| 2003/0072911 A1 * | 4/2003 | Higgins | A47G 27/0293 428/95 |
| 2003/0211308 A1 * | 11/2003 | Khandpur | B32B 5/18 428/317.3 |
| 2004/0020133 A1 * | 2/2004 | Paxton | B24D 11/02 51/307 |
| 2004/0171339 A1 * | 9/2004 | Prasad | B24B 37/24 451/526 |
| 2004/0258902 A1 | 12/2004 | Seth | |
| 2005/0060947 A1 | 3/2005 | McArdle | |
| 2005/0098540 A1 * | 5/2005 | Prasad | B24B 37/22 216/88 |
| 2006/0178099 A1 * | 8/2006 | Hishiki | B24B 37/205 451/521 |
| 2007/0066186 A1 * | 3/2007 | Annen | B24D 3/32 451/41 |
| 2007/0243802 A1 * | 10/2007 | Petersen | B24D 15/04 451/514 |
| 2009/0258585 A1 * | 10/2009 | Miekka et al. | 451/523 |
| 2009/0266001 A1 | 10/2009 | Ali | |
| 2009/0325470 A1 * | 12/2009 | Petersen | B24D 11/02 451/59 |
| 2012/0202409 A1 * | 8/2012 | Shinchi | B24B 37/24 451/526 |
| 2014/0038503 A1 * | 2/2014 | Itoyama | C08J 9/12 451/533 |
| 2014/0106652 A1 * | 4/2014 | Itoyama | C08J 9/12 451/533 |

FOREIGN PATENT DOCUMENTS

| | | |
|---|---|---|
| JP | 62-193778 | 8/1987 |
| JP | 2003-231051 | 8/2003 |
| JP | 2003231051 A | 8/2003 |
| WO | WO 2002-043925 | 6/2002 |
| WO | WO 2002-076678 | 10/2002 |
| WO | WO 2006-007036 | 1/2006 |
| WO | WO 2007-121135 | 10/2007 |

OTHER PUBLICATIONS

"Japanese Application Serial No. 2013-555432, Office Action dated Nov. 24, 2015", Without English Translation, 3 pgs.

* cited by examiner

COATED ABRASIVE ARTICLE WITH FOAM BACKING AND METHOD OF MAKING

CROSS REFERENCE TO RELATED APPLICATIONS

This application is a national stage filing under 35 U.S.C. 371 of PCT/US2012/023921, filed Feb. 6, 2012, which claims priority to U.S. Provisional Patent Application Nos. 61/446,212 filed Feb. 24, 2011, and U.S. Provisional Patent Application No. 61/470,757 filed Apr. 1, 2011, the disclosures of which are incorporated by reference in their entirety herein.

BACKGROUND

The disclosure relates to coated abrasive articles with a foam backing. Foam backed abrasive articles are useful for sanding surfaces where it is often desirable to have flexibility and conformability of the coated abrasive article to the surface. Foamed back abrasive articles can be used when sanding curved metal, curved wooden surfaces, or other workpiece geometries or materials.

SUMMARY OF THE INVENTION

Foam backed coated abrasive articles often use a foam backing made from bun casting methods. In poured bun casting, the foam raw materials are pumped into a mold and allowed to rise filling the mold. After curing, the foam block, or 'bun', is removed. At this point the foam may be cut (skived) into sheets of a desired thickness. The foam sheets are then coated with abrasive particles onto the foam directly, or the foam may be laminated onto a coated abrasive article having a cloth, film, or paper backing with adhesives. However, this method results in a rougher open cell, non-textured surface for the foam. The lack of a textured surface can be undesirable when enhanced conformability of the foam backing is desired or when increased friction between the foamed backing and a user's finger tips is desired. The roughness due to cutting can be detrimental when applying a fine grit abrasive layer to the foam surface since the foam surface may have too much inherent roughness from the cutting process creating open exposed foam cells to produce the desired uniform abrasive layer.

Textured foam surfaces can be made by embossing techniques; however, embossing produces density differences between the highly compressed areas (land areas) and lower compressed or uncompressed areas (raised areas) of the foam backing when generating the pattern. These density differences can affect the conformability of the foam backing and its hand feel during use. Additionally, low density foam materials are often unable to be processed by embossing techniques to make a textured surface.

A solution to the above embossing and cutting problems is to use a continuous blown-to-height foam production method. In this method, foaming materials are sprayed between a smooth liner and a production tooling having a plurality of microreplicated mold cavities. The foam materials are metered through a pair of nip rolls advancing the liner and the production tooling between a fixed gap. The gap between the rolls is set relative to the desired final thickness dimension of the foam backing. The lamination of the production tooling/foaming materials/smooth liner is passed through an oven to raise and cure the foam. The microreplicated production tooling is then peeled off of the foam material leaving a textured surface that replicates the pattern of the cavities in the production tooling. After removing the liner, a smooth surface having a low roughness is present for directly applying abrasive particles onto the smooth surface; especially, fine grade abrasive particles where roughness from a cut foam surface is undesirable.

This method of making the textured foam backing is advantageous since as the foam rises, it fills the cavities of the microreplicated tooling completely. Because the foam expands and forms the texture, its density throughout the foamed structure is nominally the same; unlike textured foam surfaces produced by embossing. Surprisingly, the inventors have found that no release agents, in some embodiments, are needed to remove the textured foam backing from the production tooling. Furthermore, since the foam expands into the mold cavities of the production tooling, the process is suitable to make textured surfaces in very low density foam backings.

The inventors have determined that improved release of the textured foam backing from the production tooling occurs when the geometry of the textured surface is constrained within limits. When constrained within these limits, release agents are not needed enhancing the efficiency of the foam making process. If the raised features become too tall or if the raised feature density is too great, it becomes difficult to remove the foam from the production tooling without ripping the foam leaving residual foam in the tooling's mold cavities.

Hence in one embodiment, the invention resides in a coated abrasive article comprising: a polyurethane foam backing having at least one textured surface and an abrasive layer comprising a make coat and abrasive particles on an opposing surface, the textured surface bearing an array of raised features and land areas, the textured surface having a Total Surface Area (in$^2$) per 1 in$^2$ equal to or less than 1.400, and wherein the polyurethane foam backing has substantially uniform density.

In another embodiment, the invention resides in a polyurethane foam backing comprising a textured surface bearing an array of raised features and land areas, an opposing surface opposite the textured surface, and wherein a 90 degree peel force to removed the textured surface from a production tooling comprising a plurality of microreplicated mold cavities in a contacting surface is less than 4.5 Newton/inch (1.8 N/cm).

BRIEF DESCRIPTION OF THE DRAWING

It is to be understood by one of ordinary skill in the art that the present discussion is a description of exemplary embodiments only, and is not intended as limiting the broader aspects of the present disclosure, which broader aspects are embodied in the exemplary construction.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, "substantially uniform density" means that the density of the raised features and other regions of the polyurethane foam backing are approximately the same. Thus, the pore size and distribution in the raised features is the same or similar to the pore size and distribution in other regions of the polyurethane foam backing. In other embodiments, the density of the raised features when compared to other regions of the polyurethane foam backing do not vary by more than 25, 20, 15, 10, 5, or 2.5 percent.

DETAILED DESCRIPTION

Figure 1:
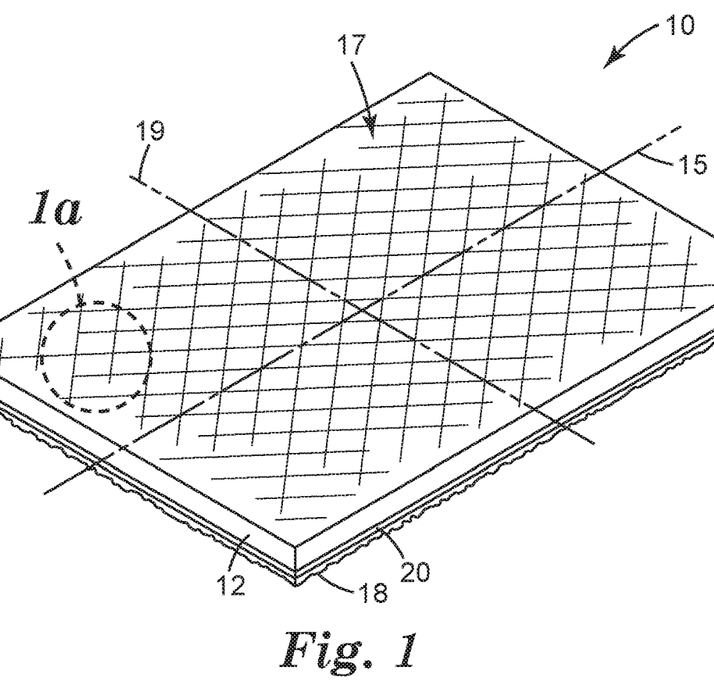
FIG. 1 illustrates a perspective view of a coated abrasive article having a foam backing comprising a textured surface.
Figure 1A:
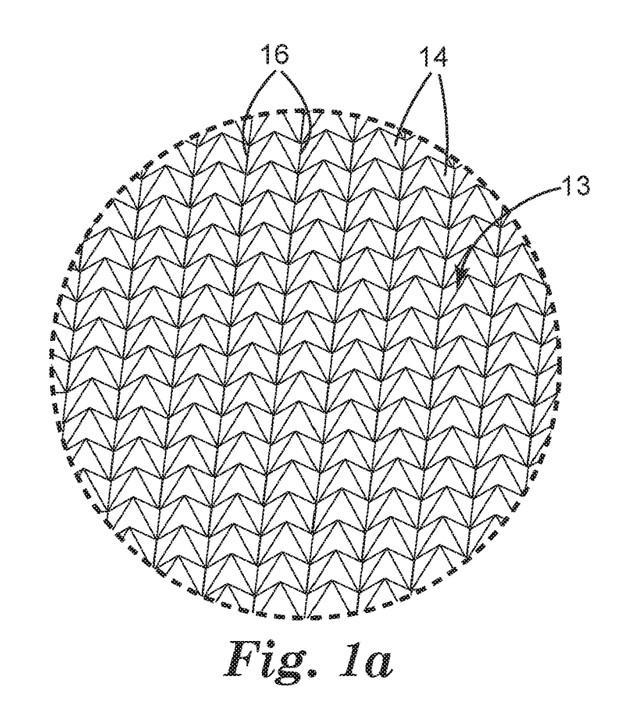
FIG. 1A illustrates an enlarged view of the textured surface of FIG. 1.

Referring to FIGS. 1 and 1A, a coated abrasive article 10 is illustrated. The coated abrasive article 10 includes a polyurethane foam backing 12 having an array 13 of raised features 14 and land areas 16 forming at least one textured surface 17. The textured surface is in contact with a user's hand when using the coated abrasive article and, in some embodiments, does not have abrasive particles attached to it. An abrasive layer 18 (make coat and abrasive particles) is present on the opposing surface 42 (FIG. 3) of the polyurethane foam backing, which can be either a smooth surface or another textured surface. The abrasive layer 18 can be directly attached to the polyurethane foam backing by a suitable make coat in one embodiment, or the abrasive layer 18 can be attached to a coated backing 20 of, for example, paper, film, or cloth. The coated backing 20, with its abrasive layer 18, can be attached to the polyurethane foam backing 12 by a suitable adhesive.

Figure 2:
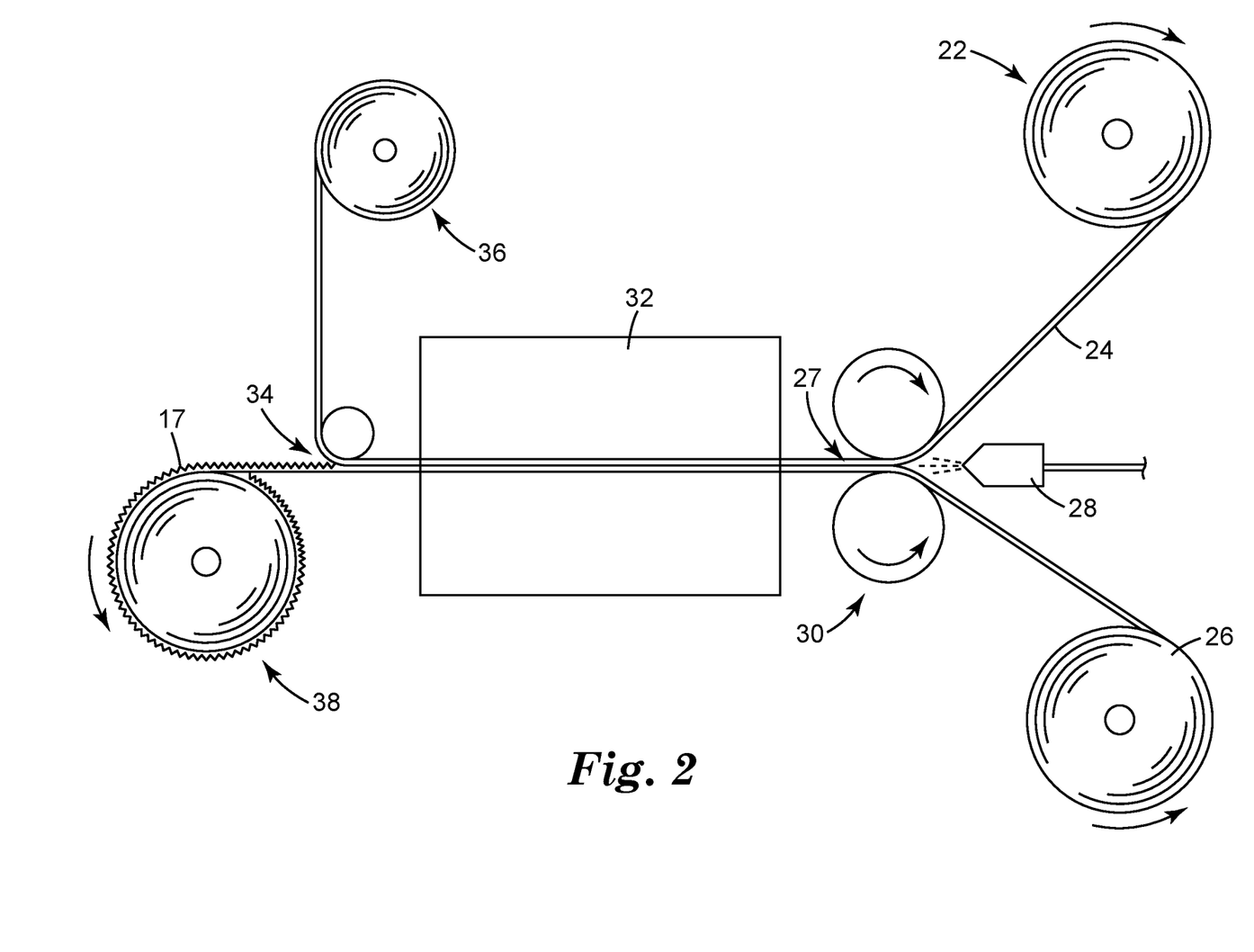
FIG. 2 illustrates a schematic process for making a foam backing comprising a textured surface.

The textured surface 17 on the polyurethane foam backing 12 can be formed by the process illustrated in FIG. 2. In FIG. 2, a production tooling 22 (often polypropylene) is unwound such that a plurality of microreplicated mold cavities in its contacting surface 24 face a liner 26 positioned in a dimensioning gap 27 between two nip rolls 30. The polyurethane foaming material 28 is sprayed into the dimensioning gap 27 between the two nip rolls 30. The lamination of the production tooling 22/polyurethane foaming materials 28/liner 26 is passed through an oven 32 to raise and cure the foam. The microreplicated production tooling 22 is then peeled off of the polyurethane foam material at approximately a 90 degree angle (34) leaving the textured surface 17 that replicates the pattern of the mold cavities in the production tooling 22. The liner 26 can be wound up as illustrated into a roll 38 with the polyurethane foam backing 12 or it can be optionally peeled off similar to the production tooling at approximately a 90 degree angle after the oven 32.

In many embodiments, the surface of the liner in contact with the polyurethane foam is selected to be a smooth surface such that minimal texture is imparted to the opposing surface 42 opposite the textured surface 17. In another embodiment, the liner 26 can be replaced with a coated abrasive web having the coated backing 20 and the abrasive layer 18 such that the polyurethane foam backing 12 is directly adhered to the coated backing 20 as it is cured in the oven 32. In another embodiment, the liner 26 can be replaced with a second production tooling such that textured surfaces are formed on both of the opposed major surfaces of the polyurethane foam backing 12. The texture imparted to the opposed major surfaces can be the same or different depending on the size, shape, and spacing of the raised features molded by each of the production tools.

Figure 3:
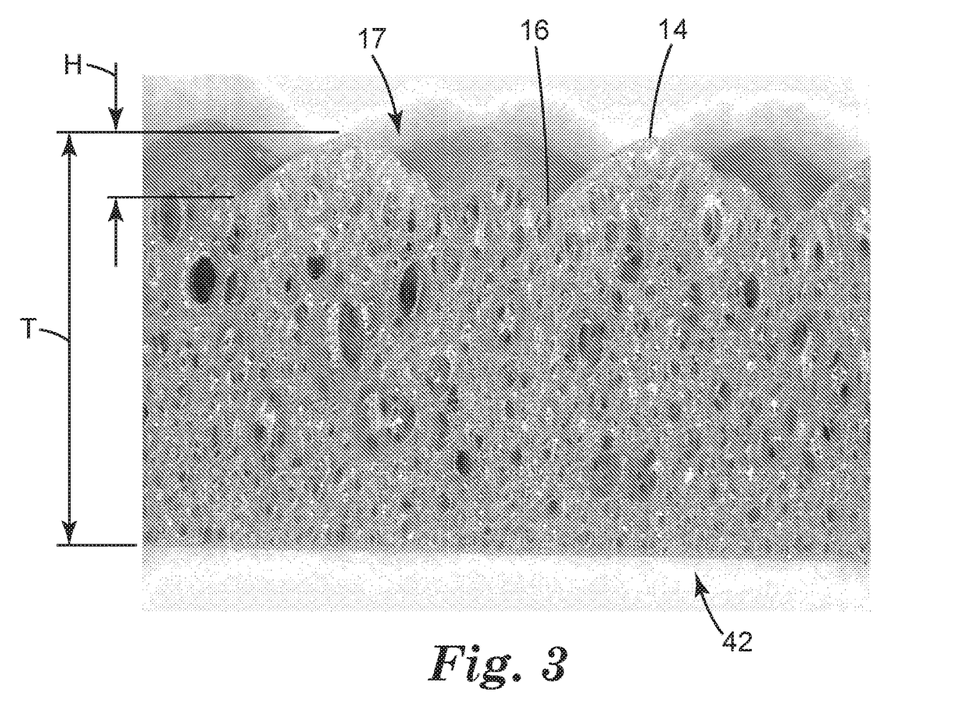
FIG. 3 illustrates a photograph of a cross-section of a foam backing at 1.2 times magnification having a substantially uniform density.

Referring now to FIGS. 1 and 3, in order to provide the desired tactile and release properties of the polyurethane foam backing 12 from the production tooling 22, various embodiments of the polyurethane foam backing can be selected. In some embodiments, the density of the raised features is specified. In particular, a raised feature density of the raised features from 20 to 80 raised features/in$^2$ (3 to 13 raised features/cm$^2$) or from 30 to 70 raised features/in$^2$ (4 to 11 raised features/cm$^2$) provides a sufficient number of raised features to improve the frictional characteristics and conformability of the polyurethane foam backing without having too many features making removal of the polyurethane foam backing from the production tooling difficult or impossible. In another aspect, the height, H, of the raised features is specified. In particular, a height from 10 to 100 mils (0.254 to 2.54 mm), or a height from 20 mils to 90 mils (0.5 to 2.3 mm), or a height from 30 mils to 80 mils (0.7 to 2.1 mm) provides a sufficient height for the raised features to improve the frictional characteristics of the polyurethane foam backing without having too tall of a height making removal of the polyurethane foam backing from the structured tooling difficult or impossible. In another aspect, the thickness, T, of the polyurethane foam backing is specified. In particular, a thickness from 3 to 7 mm, or a thickness from 4 mm to 6 mm provides a sufficient thickness to provide structural integrity to the polyurethane foam backing without compromising flexibility. In another aspect, the density of the polyurethane foam backing is specified. In particular, a density from 2 to 8 lbs/ft$^3$ (32 to 129 kg/m$^3$) or a density from 3 to 7 lbs/ft$^3$ (48 to 113 kg/m$^3$) or a density from 4 to 6 lbs/ft$^3$ (64 to 97 kg/m$^3$) provides structural integrity to the polyurethane foam backing without compromising flexibility. In another aspect, the width of the land areas is specified. In particular, a width of the land area 16 from 20 to 100 percent of the raised feature width, or from 20 to 50 percent of the raised feature width provides sufficient flexibility to the polyurethane foam backing to readily flex in both directions. In other embodiments, the land area 16 can comprise a line where adjacent raised features 14 butt up directly against one another as shown in FIGS. 1A and 3. In another aspect, the 90 degree peel force in Newton per inch to remove the production tooling 22 or textured foam backing at a 90 degree peel angle from the other substrate can be less than or equal to about 4.5, 4.0, 3.5, or 3.0 Newton per inch (1.7, 1.6, 1.4, or 1.2 N/cm) and/or greater than or equal to about 0.5 or 1.0 Newton per inch (0.1 or 0.3 N/cm) (some force is desirable to keep the foam attached to the tooling during processing). When the 90 degree peel force is less than or equal to 4.5 Newton per inch (1.7 N/cm), a release agent is not needed. Further lowering the release force leads to easier removal of the production tooling 22 from the textured surface 17 at higher manufacturing speeds. Elimination of a release agent ensures that the foam backed coated abrasive article can be used in automotive paint shops without risk of contamination to the surface being prepared for painting and greatly improves the visual appearance of the textured surface. Common release agents greatly hindered the formation of the textured surface, causing incomplete feature development, severe reduction in hand grip, reduced aesthetics, hand feel, and sheen. It is understood, that the above aspects can be selected and combined in any manner to specify the desirable attributes of the polyurethane foam backing.

Suitable shapes for the raised features can vary and include rectangular prisms, square prisms, diamond prisms (rhombohedron), triangular prisms, hexagonal prisms, square pyramids, rectangular pyramids, triangular pyramids, hexagonal pyramids, truncated prisms having 3, 4, or 6 faces, cylinders, and cones. In some embodiments, raised features having the shapes disclosed in U.S. Pat. No. 6,540,367, and in U.S. Pat. No. 7,300,479 can be used. When prisms or truncated prisms are used, the edges joining adjacent faces can be straight (FIG. 1A) forming planar faces or curved (FIG. 3A) forming curved faces.

In some embodiments, the land areas form a cross hatch pattern of lines as seen in FIG. 1 and the lines of the cross-hatch pattern intersect the longitudinal axis 15 and the transverse axis 19 at an angle other than 90 degrees. In some embodiments, the intersecting angle of the land areas with the longitudinal axis is approximately 45 degrees; although, other angles between about 10 degrees to about 80 degrees can be used. It is believed that acute intersection angles for the land areas with respect to the longitudinal axis can enhance the flexibility of the coated abrasive article for some people as a result of the way people grasp and flex the article in use since the coated abrasive article is more flexible to bending at the land areas.

Figure 3A:
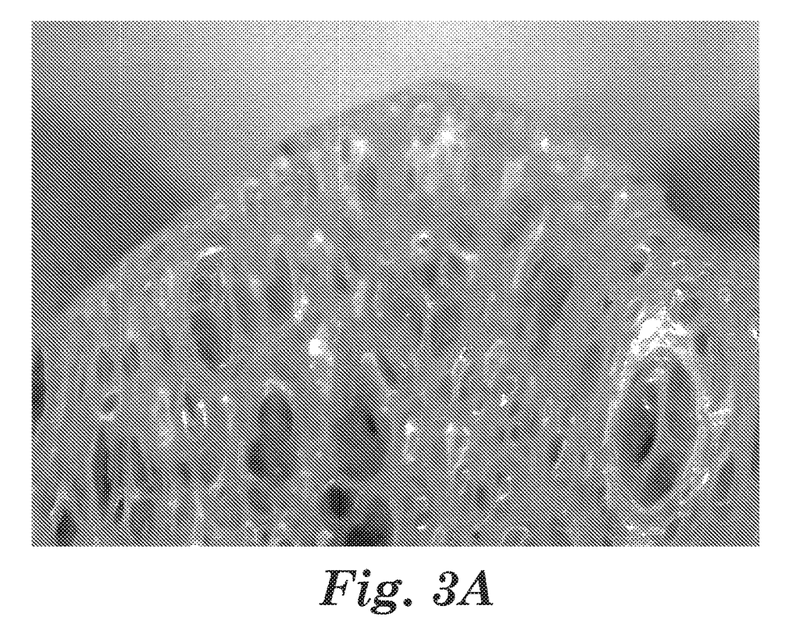
FIG. 3A illustrates a close up of a cross section of the foam backing's raised features at 5 times magnification having a substantially uniform density.
Figure 3B:
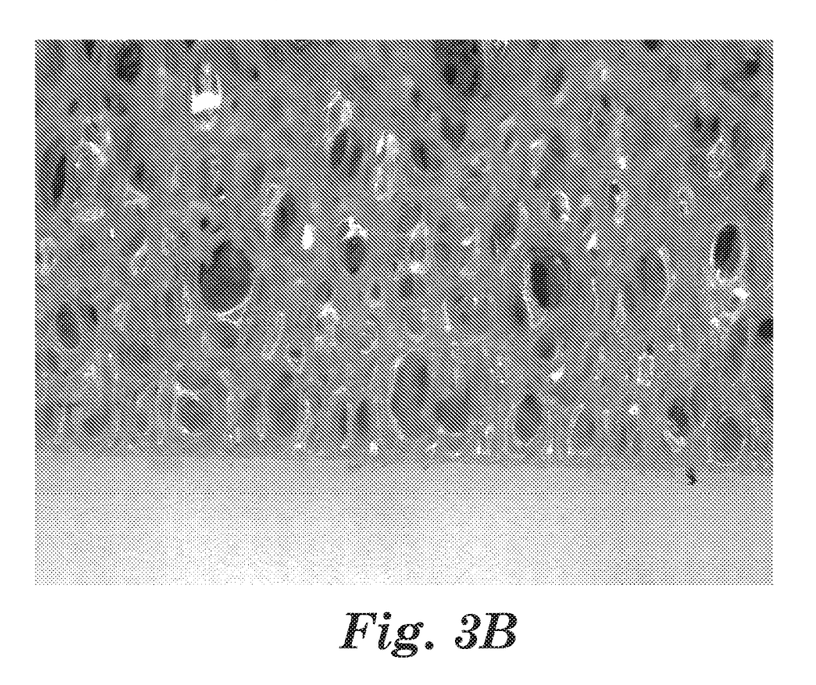
FIG. 3B illustrates a close up of a cross section of the foam backing's smooth surface at 5 times magnification having a substantially uniform density.

Referring now to FIGS. 3, 3A, and 3B, cross sections of the polyurethane foam backing 12 is shown. As seen, the polyurethane foam backing has a substantially uniform density throughout its cross section. Further, FIG. 3B shows that the opposed surface 42 (surface that the abrasive layer is adhered to) is quite smooth. Opposed surface 42 is thought to be smoother due to the continuous casting against a smooth release liner surface, which minimizes the frequency of voids at surface 42 and results in a thin skin or continuous film on the opposed surface 42 with substantially no voids present. Note that in FIGS. 3A and 3B, the foam cells and voids do not extend into the textured surface 17 or the opposed surface 42. In fact, the cross section of the cut foam cells in FIG. 3 is typical of the prior art surface that the abrasive particles would have been attached to in a bun cast and cut to thickness foam backing.

The average roughness of the opposed surface was tested by laser profilometry and three samples were found to have an average Ra of 7.88 microns and an average Rz of 59.6 microns. In contrast, a cut surface of a foam backing produced by the bun casting method and measured by laser profilometry had a three sample average Ra of 423.3 microns and an average Rz of 1713.3 microns. In various embodiments, the surface roughness of the opposed surface can have an average laser profilometry roughness, Ra, from 0 to 100 microns, or from 0 to 75 microns, or from 0 to 25 microns, or from 0 to 10 microns. In various embodiments, the surface roughness of the opposed surface can have an average laser profilometry roughness, Rz, from 0 to 1000 microns, or from 0 to 750 microns, or from 0 to 250 microns, or from 0 to 100 microns.

Surface roughness can be measured using laser profilometry as known to those of skill in the art. A suitable instrument is a B&H 3D Profiler Model Voyager 1212.2011.LT8020.ME1702 with a Micro Epsilon 1700-2 red laser triangulator sensor. Foam samples are placed on a flat, precision stage and held down flat or allowed to relax. The computer profiler software program is started, such as version 2.1, Laser Surface Profiler. The 1700-2 sensor is used and calibrated with NIST traceable gauge blocks. The laser is focused upon the opposed surface (non-textured surface) avoiding any printed areas, damaged areas, or wrinkled areas. A 10 cm×10 cm sample is scanned with 50 micron spacing in the Y direction using serpentine travel. After 200 passes, the 10×10 cm sample is mapped and the data is saved to a grid file or .grd file. The grid file is then transferred to TrueMap 4.0 software by Truegage, Inc. In Truemap 4.0, the data is corrected for foam unevenness and outliers are removed. Surface parameters, such as Ra, Rz, and Rt are then calculated. An average from at least three samples that are tested is used to determine the average roughness values.

Figure 4:
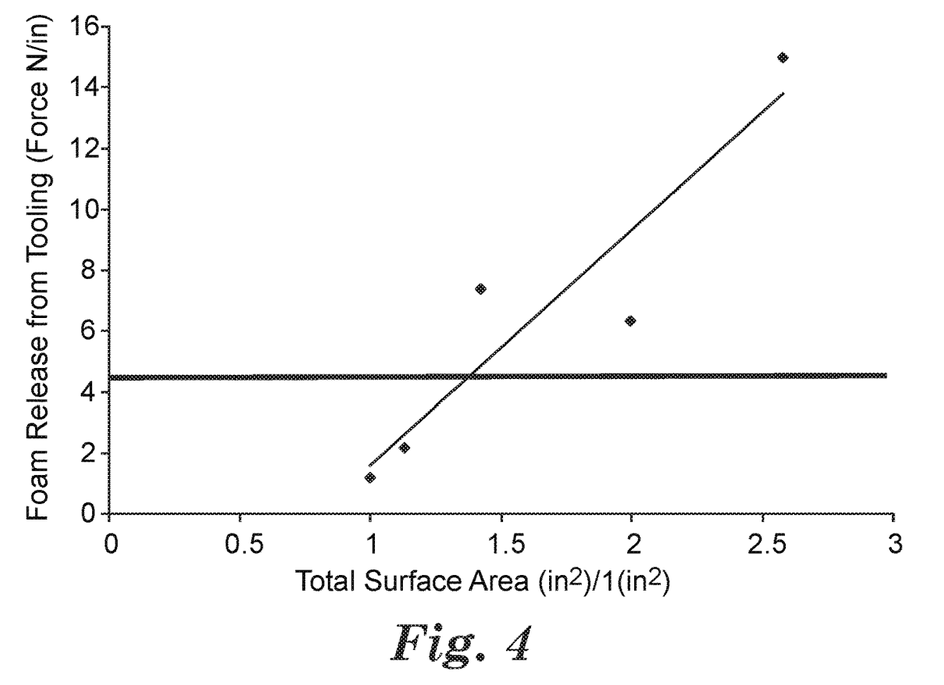
FIG. 4 illustrates a graph of Release Force versus Total Surface Area (in$^2$) per 1 in$^2$.

Referring now to FIG. 4, a graph of the 90 degree release force (peel force) of the textured foam backing from the production tooling is shown. It is necessary to control this release force so that it is possible to strip the production tooling from the textured surface at a 90 degree peel angle during manufacturing as shown in FIG. 2. The x-axis is a calculated number equal to the Total Surface Area (in$^2$) per 1 in$^2$. This number is calculated by determining the total surface area of the textured surface (raised features and land areas) in a 1.000 inch by 1.000 inch square region of the array. Thus, a flat planar surface without an array of raised features and land areas would have a value of 1.000. As the Total Surface Area (in$^2$) per 1 in$^2$ value increases, the surface becomes increasingly textured with either more raised features (higher density) or raised features having higher surface areas (taller, more facets, flat tops, etc.), or decreased land areas (abutting raised features, higher raised feature densities), or combinations of the foregoing. The calculated value (Total Surface Area (in$^2$) per 1 in$^2$) was plotted against the force necessary to separate the textured foam and the structured tooling. In order to successfully remove the production tooling or the textured foam at a 90 degree peel angle, the release force (Newton/inch) should be less than about 4.5 Newton/inch (1.7 N/cm). For convenience, the graph has a horizontal line drawn at 4.5. As seen in the graph, the Example data can be fit to a linear line with an $R^2$ value of 0.86. The equation for the line is Y=7.713×6.112. Thus, in various embodiments of the textured foam backing, the Total Surface Area (in$^2$) per 1 in$^2$ can be equal to or less than 1.400, 1.350, 1.300, 1.250, or 1.200 and greater than 1.000 (flat non-textured surface).

The foam backing is made from polyurethane foam. The basic reaction chemistry for the formation of polyurethane or isocyanate-based resins involves a condensation reaction of isocyanate (—NCO) and hydroxy (—OH) end-groups. This forms a basic polymeric unit with urethane linkage groups (i.e., $R_a$ NHC(O)—$OR_b$), from which the name to this class of materials was derived. Another reaction that plays an important role involves isocyanate (—NCO) end-groups and water molecules ($H_2O$) which react to produce carbon dioxide ($CO_2$), which serves as a blowing (foaming) agent for certain cellular products, and amine which further reacts to form disubstituted ureas linkages. In any event, the two major ingredients of polyurethane resin systems are liquid isocyanates as a source of —NCO groups and polyols as a source of hydroxyl (—OH) groups. Isocyanates used are generally difunctional (diisocyanates). Common examples include toluene (or tolylene) diisocyanate in two isomeric forms (2,4 and 2,6) which is abbreviated "TDI", and methylene di (or bis) phenyl diisocyanate which is abbreviated "MDI", also used in polymeric form ("PMDI"). Polyols, also referred to as "macroglycols", feature hydroxyl groups (—OH) as end-group and side-group. The chain length of the polyol and frequency of occurrence of —OH groups (functionality) can be varied. In general, flexible polyurethanes are associated with low functionality and long chains, while rigid ones correspond to high functionality and short chains. Polyols are generally divided into two classes: one being polyester types which generally have good resistance to oils and hydrocarbons, and polyether types, which generally have good resistance to hydrolysis (water-associated degradation). Polyurethane-type resins often feature other chemicals that play a role in the complex and varied chemical reactions associated with polyurethane chemistry. Briefly, these chemicals are often called extenders, chain-extending agents (e.g., short chain diols such as 1,4-butane diol), curative agents, cross-linking agents, or even catalysts as they are used in relatively small amounts. Conventional catalysts include, for example, amines such as tertiary amines, tin soaps and organic tin compounds. Nucleating agents, surfactants, and fire-retardants are also often added to foam forming formulations. Other suitable polyurethane foams are disclosed in U.S. Pat. No. 5,962,120.

The abrasive particles forming the abrasive layer can have a size in the range from 0.1 to 2000 micrometers, more typically from 1 to 1000 micrometers, more typically from 15 to 500 micrometers although other sizes may be used. Included among the various types of abrasive particles useful in the present invention are particles of aluminum oxide including ceramic aluminum oxide, heat-treated aluminum oxide and white-fused aluminum oxide; as well as silicon carbide, alumina zirconia, diamond, ceria, cubic boron nitride, garnet, ground glass, quartz, and combinations of the foregoing. The term "abrasive particle" also encompasses when single abrasive particles are bonded together to form an abrasive agglomerate.

Those skilled in the art will appreciate that the selection of abrasive particle composition and abrasive particle size will depend on the contemplated end use of the coated abrasive article, taking into account the nature of the workpiece surface to be treated and the abrasive effect desired. Preferably, the abrasive particles for inclusion comprise materials having a Moh's hardness of at least about 5, or at least about 8 although softer particles may be suitable in some applications. The abrasive particles are applied to the abrasive layer to provide an abrasive particle loading which is adequate for the contemplated end use of the finished article.

The make layer to hold the abrasive particles to the opposed surface 42 or to the optional coated backing 20 can be formed by coating a curable make layer precursor onto a major surface of the backing. The make layer precursor may comprise, for example, glue, phenolic resin, aminoplast resin, urea-formaldehyde resin, urethane resin, free-radically polymerizable polyfunctional (meth)acrylate (e.g., aminoplast resin having pendant alpha,beta-unsaturated groups, acrylated urethane, acrylated epoxy, acrylated isocyanurate), epoxy resin (including bis-maleimide and fluorene-modified epoxy resins), isocyanurate resin, nitrite rubber, acrylics, polyvinyl chlorides, butadiene rubbers and combinations of the oregoing. The make coat precursor is applied to the substrate (opposed major surface or optional coated backing) at a coating weight which, when cured, provides the necessary adhesion to securely bond the abrasive particles to the substrate. For typical make coats, the dry add-on weight will range from 15-50 grams/24 in$^2$ (63-210 grams/in$^2$).

Optionally, a size layer may be applied over the at least partially cured make layer precursor and abrasive particles. The size layer precursor may comprise the same precursors as listed for the make coat. The same or different precursors can be used for the make coat and the size coat. The size layer precursor may be applied by any known coating method for applying a size layer to a backing, including, e.g., roll coating, extrusion die coating, curtain coating, knife coating, gravure coating, and spray coating.

In some embodiments, the inventors have discovered that the resulting foam backed, abrasive article performs best when a urethane make coat resin is used. Since the opposing surface 42 has a continuous skin or film layer, typical make coats used for cast and cut to thickness foams are not as effective owing to the significantly different surface roughness values and properties. In particular, the Shore D durometer of the urethane make coat can be from 55 to 80 shore D, or from 65 to 75 Shore D, or from 68 to 72 Shore D. This range of Shore D hardness has sufficient softness and flexibility to adhere the abrasive particles directly to the opposing surface 42 having a relatively low surface roughness. Values above and below this range tend to be either too brittle or too stretchable for use on the opposed surface 42 having a low roughness with the skin or film layer. In one embodiment, a 70 Shore D durometer urethane make coat was used.

Figure 5:
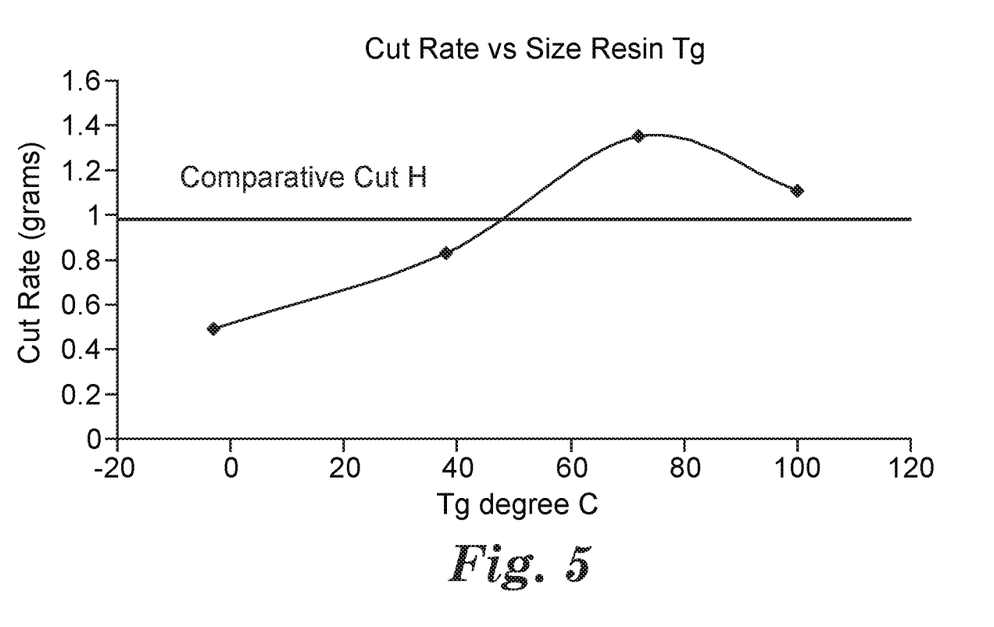
FIG. 5 illustrates a graph of Cut Rate versus Size Resin Tg.

In some embodiments, the inventors have discovered that when the abrasive particles are attached with a urethane make coat that is further coated with a size coat having a specified Glass Transition Temperature (Tg), the cute rate of the foam backed abrasive article is increased. Referring to FIG. 5, as the glass transition temperature of the size coat is increased, the cut rate increases until the glass transition temperature is about 70-75 degrees C. At that point, the cut rate again decreases showing an unexpected range for improved cut performance as a function of size resin glass transition temperature. For comparison, the cut rate of a prior art foam backed abrasive, Comparative H, a 3M contour surface sanding sponge super fine P220 is shown as a horizontal line. Glass transition temperatures can be measured, if not already provided by the manufacturer of the resin (preferred), using the Institute for Interconnecting and Packaging Electronic Circuits' test method 650 (IPC-TM-650).

As seen, the cut rate of the inventive coated abrasive article is superior to the prior art when the glass transition temperature, Tg, of the size coat is above 52 degrees C., or from 54 to 100 degrees C., or from 60 to 92 degrees C., or from 64 to 88 degrees C., or from 68 to 76 Degrees C. In one embodiment, the size coat comprised an acrylic emulsion having a glass transition temperature of 72 degrees C. The above glass transition temperature ranges result in coatings with physical properties that are complimentary to the physical properties of the urethane make coat and the skin or film layer of the opposed surface 42. Use of a urethane make coat and an acrylic size coat with a specified glass transition temperature in combination with the smooth opposed surface 42 enables coating fine abrasive particles directly onto the opposed surface while achieving higher cut rates than the prior art while still providing the same resulting finish roughness on the work piece after use.

The optional coated backing 20 can be any conventional abrasive backing Examples of useful backings include polymeric film, primed polymeric film, cloth, paper, vulcanized fiber, nonwovens, and combinations thereof. The backing may also contain a treatment or treatments to seal the backing and/or modify some physical properties of the backing. These treatments are well known in the art.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Comparative Example A

A polyurethane foam sheet with a textured surface was prepared by mixing the composition specified in Table 1 in a pin mixer and spraying the mixture into a dimensioning nip gap set at approximately 3 mils (76.2 micrometers) gap between a microreplicated polypropylene production tooling and a smooth polypropylene coated paper liner.

The microreplicated polypropylene production tooling having a plurality of microreplicated mold cavities was prepared according to the disclosure of U.S. Pat. No. 5,435,816 (Spurgeon et al.), column 8, line 41 thorough column 10, line 20. The tooling's pattern was an array of cubes 24.5 mils (0.633 mm) high×87.5 mils (2.22 mm) long×87.5 mils (2.22 mm) wide having a land area of 64 mils (1.62 mm) between features, with a feature density of 49 features/sq in (7.6/sq. cm). The Total Surface Area (in$^2$) per 1 in$^2$ was 1.420.

The polypropylene coated paper liner was "19# PP 120 Ra microinches/12 pt C1S/19# PP 60 Ra microinches (polypropylene coated bleached board)" from International Converters of Kaukauna, Wis. This liner has a smooth side and a matte side. The liner was oriented such that the matte side contacted the polyurethane foam.

This composite of liner/foam/production tooling was then passed at 60 ft/min (18.3 m/min) through 120 feet (36.6 m) of oven set at 220 degrees Fahrenheit (104 degrees C.).

Example 1

Example 1 was prepared identically to Comparative Example A with the exception that the microreplicated polypropylene production tooling's pattern was an array of four-sided pyramids 40 mils (1.02 mm) high×90.5 mils (2.30 mm) square base having a land area of 16 mils (0.41 mm) between features and a feature density of 64 features/sq in (9.92 features/sq cm). The Total Surface Area (in$^2$) per 1 in$^2$ was 1.131.

Comparative Example B

Comparative Example B was prepared identically to Comparative Example A with the exception that the microreplicated polypropylene production tooling's pattern was an array of hexagons 55 mils (1.40 mm) high×78.5 mils (1.99 mm) on each side having a land of 41.5 mils (1.05 mm) between features and a feature density of 38.5 features/sq in (5.97 features/sq cm). The Total Surface Area (in$^2$) per 1 in$^2$ was 1.997.

Comparative Example C

Comparative Example C was prepared identically to Comparative Example A with the exception that the microreplicated polypropylene production tooling's pattern was an array of three-sided equilateral base pyramids 100 mils (2.54 mm) high×110.5 mils (2.81 mm) each side of the base having a land of 10 mils (0.25 mm) between features with a feature density of 140 features/sq in (21.7 features/sq cm). The Total Surface Area (in$^2$) per 1 in$^2$ was 2.580.

Comparative Example D

Comparative Example D was prepared identically to Comparative Example A with the exception that a second liner was substituted for the polypropylene tooling. Comparative Example D was a control example with both major surfaces remaining identically featureless. The Total Surface Area (in$^2$) per 1 in$^2$ was 1.000.

TABLE 1

Foaming Composition

| Component | Description | Parts per 100 polyol | % by Weight |
|---|---|---|---|
| ARCOL 34-28 | Polyether polyol, Bayer USA, Pittsburgh, PA | 100 | 62.57 |
| CARPOL GP-700 | Polyether polyol, Carpenter Co, Richmond, VA | 2.50 | 1.56 |
| Water | Tap water | 1.25 | 0.78 |
| DISPERSITECH Brown 2552 | Colorant, Milliken Chemical, Aston, PA | 2.6 | 1.63 |
| TEGOSTAB B-8418 | Surfactant, Evonik Industries, Hopewell, VA | 0.20 | 0.13 |
| Ethylene Glycol | Solvent, Quaker City Chemicals, Philadelphia, PA | 2.25 | 1.41 |
| 1,4 Butanediol | Solvent, Air Products and Chemicals Inc., Allentown, PA | 3.00 | 1.88 |
| POLYCAT 1058 | Co-catalyst, Air Products and Chemicals, Inc., Allentown, PA | 0.60 | 0.38 |
| DABCO 131 | Organotin catalyst, Air Products and Chemicals, Inc., Allentown, PA | 0.20 | 0.13 |
| RUBINATE 1245 | Polymeric methylene diphenyl diisocyanate (MDI), Huntsman Corporation, Auburn Hills, MI | 47.2 | 29.53 |

Peel Force Test Method

Test specimens from the Examples were evaluated for interfacial adhesion at both the liner/foam interface and the foam/production tooling interface. All tests were performed following guidelines established by ASTM D6862 "Standard Test Method for 90 Degree Peel Resistance of Adhesives". The load frame used was a "MTS Alliance Load Frame 100" manufactured by MTS, Eden Prairie, Minn. Acquisition software was "MTS TestWorks 4" (TW4). The load cell was a "MTS PN 4501006/8" with 10 Newtons full scale. The load cell was calibrated prior to testing both internally via TW4, and also empirically by hanging weights of 50 gf and 100 gf from the fixture attached to the load cell and verifying the output from the load cell via TW4 was within 1% of the expected value.

The samples were tested as-received in rectangular sections of 1 inch×7 inch (2.54 cm×17.8 cm). For 90 degree peel testing of the liner/foam interface, the tooling layer was removed and the liner adhered with low compliance "3M Scotch-Weld CA4 Instant Adhesive" (3M, St. Paul, Minn.) to an aluminum plate below and at 90 degrees orientation with respect to the axis of load frame crosshead motion. (The liner/foam peel test procedure for Comparative Example A was changed to accommodate the fact that the foam layer could not be removed from the tooling without damage. So for Comparative Example A, the foam/tooling composite was peeled from the liner that was adhered to the aluminum plate.) For tests measuring adhesion between foam/production tooling, the liner layer was removed and the production tooling adhered to the plate. Delamination was initiated between foam and the substrate (liner or production tooling) by manually pulling and thus separating foam from the substrate until enough foam was available to provide a pull-tab which was then mounted in a one-inch wide spring clamp. The clamp in turn was mounted to the load cell. Prior to testing, it was verified that no preload was exerted upon the sample by the load cell/fixture by observing the digital load display from the TW4 on a personal computer configured with the TW4 software.

The force test was initiated with a software command using TW4 and upon test initiation, the crosshead of the load frame and foam sample were pulled away from the substrate at a rate of 10 inches/minute (25.4 cm/min). Load [Newton] vs crosshead displacement [mm] were observed on the PC monitor while TW4 recorded load and displacement at a sample rate of 25 hz. After testing, load vs. displacement was plotted, and the average peel resistance force [Newton] was calculated over the load plateau region of the test, which was about 25 mm for most samples. Five specimens were tested for each Example. The average test results and standard deviation are shown in Table 2.

TABLE 2

Peel Force Data

| Example | Total Surface Area (in$^2$) per 1 in$^2$ | Height, H mils (mm) | Foam/Liner interface 90 Degree Peel N/in. | St. Dev. | Foam/Tooling interface 90 Degree Peel N/in. | St. Dev |
|---|---|---|---|---|---|---|
| Comp. A | 1.420 | 24.5 (0.622) | 1.223 | 0.07 | 7.392 | 0.52 |
| 1 | 1.130 | 40 (1.02) | 1.283 | 0.04 | 2.188 | 0.17 |
| Comp. B | 1.997 | 55 (1.40) | 1.170 | 0.05 | 6.353 | 0.97 |
| Comp. C | 2.580 | 100 (2.54) | 0.482 | 0.034 | Cohesive failure of foam | n.d.[1] |
| Comp. D | 1.000 | 0 | 1.23 | 0.05 | n/a[2] | n/a |

[1]n.d. = not determined
[2]n/a = not applicable

Examples 2 and 3 and Comparative Examples E Through H

Examples 2 and 3 and Comparative Examples E through G demonstrate the effect of the Tg of the size resin on the abrasive efficacy of resulting abrasive articles in comparison to a prior art foam backed coated abrasive article. Abrasive articles were prepared from the polyurethane foam backing of Example 1. To the foam backing a make coat of Urethane resin, 70 Shore D hardness, at a weight of 0.4 g/4×6 inches of backing and Grade P220 Aluminum Oxide abrasive particles at 2.4 g/4×6 inches of backing were applied. Size coats of varying glass transition temperatures, Tg (according to the manufacture's data), and controlled weights for proper resin fill were applied over the abrasive layer as shown in Table 3. The resulting abrasive articles were tested to determine their respective cut on a cellulose acetate butyrate (CAB) work piece according to the Sanding Test.

The Sanding Test uses a machine controlled sanding arm with a backup pad in contact with a 2.5"×5.5" foam backed abrasive article at a down force of 13.5 lbf in an X motion and then a Y motion across a 21"×15" substrate made of CAB in 1 minute cycles. 1 cycle is approximately 1102.5 inches in length with 60 passes in 60 seconds of 18⅜ inch in length on the 15" by 21" panel. The arm is indexed over about 0.03063 inch between each pass up and down the long direction of the CAB work piece. This is repeated for 6 cycles. Total cut is reported as the addition of the 6 cycles together. Finish is measured using a Taylor-Hobson profilometer in the sanding path after the first cycle. Test results are shown in Table 3.

TABLE 3

Cut Rate and Finish

| Example | Size Resin | Size Resin Tg, = C | Cut, grams | Finish, μinch |
|---|---|---|---|---|
| Comp. E | Phenolic | 250 | n.d.[3] | n.d. |
| 2 | Phenolic Arofene 15 Ashland Inc. Covington OH | 100 | 1.11 | 22 |
| 3 | Acrylic Emulsion Carbocure TSR-72 Lubrizol Corp. Wickliffe, OH | 72 | 1.35 | 25 |
| Comp. F | Acrylic Binder TR407 Dow Chemical Midland, MI | 38 | 0.83 | 24 |
| Comp. G | Acrylic Emulsion Hycar 2679 Lubrizol Corp. Wickliffe, OH | −3 | 0.49 | 24 |
| Comp. H 3M Contour Surface Sanding Sponge Super Fine P220 | Acrylate/Acrylonitrile (make coat: nitrile rubber) | 124 | 0.98 | 22 |

[3]n.d. = not determined, size resin too brittle

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A coated abrasive article comprising: a polyurethane foam backing comprising a continuous and integral textured foam surface on one side of the foam backing and an abrasive layer comprising a make coat and abrasive particles on an opposing side surface of the backing, the continuous textured foam surface comprising an array of raised features and land areas, the continuous textured foam surface having a total surface area (in$^2$) per 1 in$^2$ of greater than 1.000 and equal to or less than 1.400, and wherein the polyurethane foam backing has uniform porosity density in which the porosity density throughout the entire foam backing including the integral textured foam surface does not vary by more than 25%.

2. The coated abrasive article of claim 1 wherein the density of the polyurethane foam backing is from 2 to 8 lbs/ft³ (32 to 129 kg/m3).

3. The coated abrasive article of claim 1 wherein a thickness of the polyurethane foam backing is from 3 to 7 mm.

4. The coated abrasive article of claim 1, wherein a height of the raised features is from 10 to 100 mils (0.25 to 2.54 mm).

5. The coated abrasive article of claim 1, wherein a raised feature density is from 20 to 80 raised features per in² (3 to 13 raised features per cm²).

6. The coated abrasive article of claim 1, wherein an average surface roughness of the opposing surface is from 0 to 100 microns.

7. The coated abrasive article of claim 1, wherein the make coat comprises a urethane having a hardness from 55 to 80 Shore D.

8. The coated abrasive article of claim 7 wherein a size coat is applied over the abrasive layer, the size coat comprising an acrylic having a glass transition temperature from 54 to 100 degrees C.

9. The coated abrasive article of claim 1, wherein substantially no voids extend into the continuous textured foam surface or the opposing side surface.

10. The coated abrasive article of claim 1, wherein the continuous textured foam surface comprises raised features which are directly abutting and land features which are a line.

11. The coated abrasive article of claim 1 wherein the raised features have a shape of one or more of rectangular prisms, square prisms, diamond prisms (rhombohedron), triangular prisms, hexagonal prisms, square pyramids, rectangular pyramids, triangular pyramids, hexagonal pyramids, truncated prisms having 3, 4, or 6 faces, cylinders, and cones.

12. An abrasive article comprising: a polyurethane foam backing comprising a continuous and integral textured foam surface comprising an array of raised features and land a reason one side of foam backing and an abrasive layer on an opposing side surface of said backing, wherein during production of the backing, a 90 degree peel force required to remove the continuous textured foam surface from a production tooling comprising a plurality of microreplicated mold cavities in a contacting surface is less than 4.5 Newton/inch (1.7 N/cm), and wherein the polyurethane foam backing has uniform porosity density in which the porosity density throughout the entire foam backing including the integral textured foam surface does not vary by more than 25%.

13. The abrasive article of claim 12 wherein the density of the polyurethane foam backing is from 2 to 8 lbs/ft³ (32 to 129 kg/m3).

14. The abrasive article of claim 12 wherein a thickness of the polyurethane foam backing is from 3 to 7 mm.

15. The abrasive article of claim 12, wherein a height of the raised features is from 10 to 100 mils (0.25 to 2.54 mm).

16. The abrasive article of claim 12, wherein a raised feature density is from 20 to 80 raised features per in² (3 to 13 raised features per cm²).

17. The abrasive article of claim 12, wherein an average surface roughness of the opposing side surface is from 0 to 100 microns.

18. The abrasive article of claim 12, wherein the contacting surface comprises polypropylene and a release agent is not applied to the contacting surface.

19. A coated abrasive article comprising: a polyurethane foam backing comprising a continuous and integral textured foam surface on one side of the foam backing, the continuous textured foam surface comprising an array of raised features and land areas and wherein the polyurethane foam backing has uniform porosity density; and an abrasive layer comprising a make coat and abrasive particles on an opposing side surface of the backing; the make coat comprising a urethane having a hardness from 55 to 80 Shore D; and a size coat is applied over the abrasive layer, the size coat comprising an acrylic having a glass transition temperature from 54 to 100 degrees C. wherein the polyurethane foam backing has uniform porosity density in which the porosity density throughout the entire foam backing including the integral textured foam surface does not vary by more than 25%.

20. The coated abrasive article of claim 19, wherein the opposing side surface of the foam backing is smoother than the continuous textured surface.

* * * * *

UNITED STATES PATENT AND TRADEMARK OFFICE
CERTIFICATE OF CORRECTION

PATENT NO. : 10,675,794 B2  
APPLICATION NO. : 13/984766  
DATED : June 9, 2020  
INVENTOR(S) : Joseph Eckel Page 1 of 1

It is certified that error appears in the above-identified patent and that said Letters Patent is hereby corrected as shown below:

On the Title Page

Column 1 (Inventors), Line 1, delete "Shoreview, MN (US);" and insert -- Vadnais Heights, MN (US); --, therefor.

Column 2 (Abstract), Line 7, delete "accept able." and insert -- acceptable. --, therefor.

In the Specification

Column 6, Line 42, delete "7.713×6.112." and insert -- 7.713×-6.112. --, therefor.

Column 8, Line 64, delete "backing" and insert -- backing. --, therefor.

In the Claims

Column 13, Line 3, in Claim 2, delete "m3)." and insert -- $m^3$). --, therefor.

Column 13, Lines 39-40, in Claim 12, delete "a reason" and insert -- areas on --, therefor.

Column 14, Line 10 (approx.), in Claim 13, delete "m3)." and insert -- $m^3$). --, therefor.

Signed and Sealed this  
Twenty-second Day of September, 2020

Andrei Iancu  
*Director of the United States Patent and Trademark Office*